United States Patent
Mannari et al.

(10) Patent No.: US 10,414,636 B2
(45) Date of Patent: Sep. 17, 2019

(54) CARGO HANDLING BY A SPREADER

(71) Applicant: KONECRANES GLOBAL CORPORATION, Hyvinkää (FI)

(72) Inventors: Ville Mannari, Vantaa (FI); Ari Nieminen, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 402 days.

(21) Appl. No.: 14/894,443

(22) PCT Filed: May 26, 2014

(86) PCT No.: PCT/FI2014/050408
§ 371 (c)(1),
(2) Date: Nov. 27, 2015

(87) PCT Pub. No.: WO2014/191618
PCT Pub. Date: Dec. 4, 2014

(65) Prior Publication Data
US 2016/0122161 A1    May 5, 2016

(30) Foreign Application Priority Data
May 31, 2013   (FI) .................................... 20135609

(51) Int. Cl.
| | |
|---|---|
| B66C 13/46 | (2006.01) |
| B66C 1/10 | (2006.01) |
| G01B 11/22 | (2006.01) |
| G01B 11/24 | (2006.01) |
| G05B 15/02 | (2006.01) |

(Continued)

(52) U.S. Cl.
CPC .............. *B66C 13/46* (2013.01); *B66C 1/101* (2013.01); *B66C 1/42* (2013.01); *B66C 13/085* (2013.01);
(Continued)

(58) Field of Classification Search
CPC ....................................................... B66C 13/46
See application file for complete search history.

(56) References Cited

U.S. PATENT DOCUMENTS

| | | | | |
|---|---|---|---|---|
| 4,139,107 A | * | 2/1979 | Ninomiya | ............ B65G 1/0421 |
| | | | | 212/276 |
| 5,152,408 A | * | 10/1992 | Tax | ........................ B66C 13/063 |
| | | | | 212/270 |

(Continued)

FOREIGN PATENT DOCUMENTS

| | | |
|---|---|---|
| CN | 2484295 Y | 4/2002 |
| DE | 195 19 741 A1 | 12/1996 |

(Continued)

*Primary Examiner* — Charles D Garber
*Assistant Examiner* — Alia Sabur
(74) *Attorney, Agent, or Firm* — Birch, Stewart, Kolasch & Birch, LLP (57) ABSTRACT

There is provided improved accuracy in cargo handling by a spreader (306) including a distance sensor (308a, 308b) transmitting optical signals. The handled cargo (312) includes a plurality of interconnected sides (312a, 312b). The transmission directions of the optical signals are selected and distances are measured by reflected optical signals transmitted in the selected directions. The measured distances are used to determine a reference line that matches a shape of at least one of the interconnected sides (312a, 312b) of the cargo (312).

20 Claims, 4 Drawing Sheets

(51) Int. Cl.
    *B66C 1/42*          (2006.01)
    *B66C 13/08*        (2006.01)
    *B66C 13/16*        (2006.01)
    *G01S 7/481*        (2006.01)
    *G01S 17/42*        (2006.01)

(52) U.S. Cl.
    CPC .............. *B66C 13/16* (2013.01); *G01B 11/22* (2013.01); *G01B 11/24* (2013.01); *G01S 7/4813* (2013.01); *G01S 17/42* (2013.01); *G05B 15/02* (2013.01)

(56) References Cited

U.S. PATENT DOCUMENTS

| | | |
|---|---|---|
| 6,124,932 A | 9/2000 | Tax et al. |
| 2002/0024598 A1 | 2/2002 | Kunimitsu et al. |
| 2002/0191813 A1 | 12/2002 | Uchida et al. |
| 2005/0281644 A1* | 12/2005 | Lussen .................. B66C 13/085 |
| | | 414/403 |

FOREIGN PATENT DOCUMENTS

| | | | |
|---|---|---|---|
| EP | 0 668 236 A1 | 8/1995 | |
| EP | 0668236 A1 * | 8/1995 | ........... B66C 13/063 |
| JP | 2003-238071 A | 8/2003 | |
| JP | 2006273532 A * | 10/2006 | |
| KR | 10-0624008 B1 | 9/2006 | |
| KR | 20060097972 A * | 9/2006 | |
| KR | 10-1058594 B1 | 8/2011 | |
| WO | WO 9219526 A1 * | 11/1992 | ............... B66C 9/16 |
| WO | WO 2013/011200 A1 | 1/2013 | |

\* cited by examiner

CARGO HANDLING BY A SPREADER

BACKGROUND

A large portion of international transport is performed by using containers. Containers are transportation units having standardized dimensions and used to contain the transported goods during the transportation. Typically containers exist in three sizes, having lengths of 20 feet, 40 feet or 45 feet. The width of the containers is typically 2.5 meters.

The containers are handled in container terminals typically located at harbours or inland. At the container terminals, the containers are handled by using particular cranes, including a Rail Mounted Gantry Crane (RMG-crane), and a Rubber Tyred Gantry Crane (RTG-crane), for example. A particular type of the RMG-crane is a ship-to-shore crane that is used to unload containers from the ship to the pier and load the containers from the pier to the ship.

The cranes are equipped with an attachment part for attaching to the container. A typical attachment part is a spreader that has variable dimensions to allow handling of different sizes of containers. Spreaders known as tandem and twinlift spreader can attach to two or more containers at a time.

Typical handling of containers includes operations such as stacking and picking up of containers. For example 5 containers can be stacked on top of each other. The stacking requires great precision from the person driving the crane, since the corners of the stacked containers have to be aligned with a precision of at least 5 cm. If the stacking is not performed with sufficient precision the whole stack may fall.

During handling of the containers, the spreader experiences vibrations and shocks from various sources, for example when attaching the spreader to a container for picking up the container and when lowering a container attached to the spreader to the ground, ship, trailer or chassis, or on top of another container. The vibrations and shocks make it difficult to handle the containers with sufficient precision. The vibrations and shocks are especially present in container handling, when a container carried by the spreader is released, e.g. when containers are stacked on top of each other or to the ground. On the other hand, damping of the vibrations and shocks may induce a delay to the operations performed in the containers. Increased delay causes a reduction to the efficiency of the container handling.

Depending on the weight of the container attached to the spreader, the spreader may be bent by the weight of the container. When the container is detached from the spreader, the spreader bends back again to its original shape. The bending makes it difficult to measure dimensions, since a spreader supports a heavy container at a lower height, when the spreader is bent.

Typically a spreader is attached to a crane via head block, using similar twist lock mechanism that is used in spreaders to attach to containers. The head block is connected to the ropes used for hoisting the spreader. The twist lock mechanism typically has some clearance to allow the spreader and the head block to move with respect to each other. However, when the position of the spreader is determined by the position of the head block, especially in automated operation of the spreader, the clearance introduces inaccuracy to the positioning of the spreader.

Crane operations are increasingly automated to provide faster handling of containers. Typically automated operations are followed by the driver via display. The driver can be located in the cabin of the crane or in a remote location from the crane. This means that operations performed on the containers are highly dependent on the correct operation of the automation equipment and the information conveyed to the driver by the system. Malfunctions or maintenance of the automation equipment leads to downtime of the crane during which the container traffic is on hold.

Automated crane operations typically involve positioning of the spreader for example by means of cameras and lasers. Positioning of the spreader is also described in the Finnish national patent application No. 20115757, which is incorporated herein by reference in its entirety.

Sensors may be installed to cranes to facilitate their automation. Sensors are typically installed to high altitudes, for example to trolley structures 20 meters above the ground. With such distances even the smallest of errors in the positioning of the sensors, e.g. angle, can have a very dramatic effect on the accuracy of operations performed at the ground level. Installation and calibration of such sensors is often a cumbersome and a labor intensive task. Additionally, the calibration as a process is complex and requires a specialized person to perform it.

BRIEF DESCRIPTION OF THE EMBODIMENTS

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

Various embodiments comprise a method, apparatuses and a cornputer program product as defined in the independent claims. Further embodiments are disclosed in the dependent claims.

According to an aspect there is provided a method of cargo handling by a spreader including a distance sensor transmitting optical signals, the method comprising handling cargo that includes a plurality of interconnected sides, selecting directions for transmitting optical signals, measuring distances by reflected optical signals transmitted in the selected directions, determining on the basis of the measured distances a reference line that matches a shape of at least one of the interconnected sides of the cargo.

According to an aspect there is provided a cargo handling apparatus including a spreader for attaching to a cargo including a plurality of interconnected sides, the spreader including a distance sensor capable of transmitting optical signals in selected directions, and a controller connected to the distance sensor to measure distances in the selected directions, the cargo handling apparatus further including means for determining on the basis of the measured distances a reference line that matches a shape of at least one of the interconnected sides of the cargo.

According to an aspect there is provided an apparatus configured to perform the steps of a method according to an aspect.

According to an aspect there is provided an apparatus comprising means configured to perform a method according to an aspect.

A computer program product comprising executable code that when executed, causes execution of steps of a method according to an aspect.

According to another aspect there is provided an apparatus comprising at least one processor, and at least one memory including computer program code, the at least one memory and the computer program code configured to, with the at least one processor, cause the apparatus at least to perform a method according to an aspect.

According to another aspect there is provided a computer program embodied on a non-transitory computer readable storage medium, the computer program being configured to control a processor to perform a method according to an aspect.

According to another aspect there is provided a kit for upgrading an apparatus for cargo handling by a spreader, the kit comprising a distance sensor capable of transmitting optical signals in selected directions, and a controller connected to the distance sensor to measure distances in the selected directions, wherein the controller and the distance sensor are configured to determine on the basis of the measured distances a reference line that matches a shape of at least one of the interconnected sides of the cargo.

According to another aspect there is provided a method of upgrading an apparatus for cargo handling by a spreader comprising, installing a kit according to an aspect to the cargo handling apparatus.

Although the various aspects, embodiments and features of the invention are recited independently, it should be appreciated that all combinations of the various aspects, embodiments and features of the invention are possible and within the scope of the present invention as claimed.

Some aspects provide improvements comprising improved accuracy of cargo handling. Particularly, where a distance sensor, for example a laser scanner, is installed to a spreader for measuring distances, errors to the measurements resulting from shocks, vibrations and/or movement of the distance sensors during cargo handling may be mitigated.

Some aspects provide freedom in positioning distance sensors to a cargo handling apparatus, for example a spreader. Since distance measurements employ reference lines, calibration of distance sensors to a particular position of installation in the cargo handling apparatus may be omitted.

BRIEF DESCRIPTION OF THE DRAWINGS

In the following, embodiments will be described with reference to the accompanying drawings in which.

DETAILED DESCRIPTION

Various embodiments described herein provide improved accuracy of cargo handling operations, when a distance sensor is installed to a spreader for measuring distances. Cargo handling operations include picking up of cargo from a stack or the ground, stacking cargo to a stack or the ground, and loading vehicles, e.g. trailers or trucks or ships, with cargo for transportation. Improved accuracy is also provided, for moving cargo attached to a spreader to a new location, e.g. a stack, to the ground or to a vehicle. Typically, the cargo attached to the spreader is moved by hoisting and/or trolley movement.

In an embodiment, a distance sensor may comprise an optical measurement device that transmits optical signals and measures distances based on received reflections of the transmitted optical signals. An example of such an optical measurement device is a laser scanner that transmits laser beams to a plurality of different directions. The directions of the laser beams may be defined by an opening angle, where the transmission directions of the laser beams are selected. Within the opening angle, the laser beams can be transmitted in different transmission angles. A distance measured from a reflection of a transmitted optical signal may be used to determine a point in a coordinate system by using the measured distance and the transmission angle. The coordinate system may comprise one or more axes, for example X and Y axes according to the Cartesian coordinate system. In the following FIGS. 3a, 3b, 4a, 4b, 6a and 6b, the points that are determined from the measurements to the walls of the containers are shown in black dots in the container walls.

A difference between adjacent transmission angles defines a resolution of the distance measurements within the opening angle. Typically selection of different transmission angles are implemented by a rotating mirror that directs the laser beams to the transmission angles within a sector defined by the opening angle. The difference between the adjacent transmission angles may be for example 0.25 degrees. Distance measurements from the entire opening angle are obtained by rotation of the mirror during which the mirror directs the laser beams to every transmission angle within the opening angle. This distance measurement is typically referred to as a laser sweep. Further measurements may be performed by further rotations of the mirror. Accordingly, distance measurements at each rotation represent measured distances at the time instant of the measurement. If objects, e.g. containers, within the opening angle move or the distance sensor move between measurements, the results of the measurements change. The range of measurements of the distance sensor, e.g. the laser scanner, may be limited by a reception sensitivity of the distance sensor. The range of the measurements is the working distance between endpoints over which the distance sensor will reliably measure a distance to a target within its opening angle for transmissions of optical signals.

Figure 1:
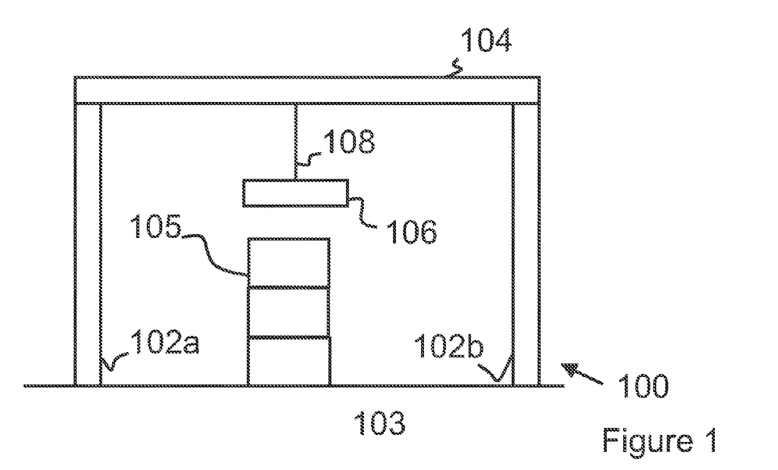
FIG. 1 illustrates a cargo handling apparatus including a spreader according to an embodiment.

FIG. 1 illustrates a cargo handling apparatus 100 including a spreader 106 according to an embodiment. The cargo handling apparatus comprises substantially vertical support structures 102a, 102b that provide elevation from the ground 103 for moving the spreader 106 above cargo 105 between the vertical structures. The cargo between the vertical support structures may comprise a stack of containers, e.g. a stack of three containers according to the illustration, whereby the elevation provided by the vertical support structures allows movement of the spreader and a container attached to the spreader over the stack. It should be appreciated that the stack may include more or less containers than three and there may be multiple stacks of containers having the same or different heights situated between the vertical support structures.

A bridge 104 extends between the vertical support structures. The spreader is connected to the bridge by one or more ropes 108 or equivalent means that provide descending and ascending of the spreader by hoisting machinery that reels the rope in and out. The spreader is movable on the bridge and between the vertical support structures. The movement may be provided by rails for example. In this way the spreader can move over a plurality of cargo 105 situated between the vertical support structures. Accordingly, the bridge allows the spreader to move typically both in a horizontal direction between the vertical support structures and in a vertical direction between the bridge and the ground. Typically the horizontal and the vertical movement are provided by a trolley that moves on the bridge between the vertical support structures and includes the hoisting machinery for descending and ascending the spreader.

Typically, when cargo is picked up from the ground or from a stack of cargo, the spreader is lowered. When cargo is attached to the spreader, the cargo is pulled up to a height, where it may be moved along the direction of the bridge and/or in the depth direction of the FIG. 1. Movement in the depth direction is typically provided by the vertical support structures including wheels to allow movement of the whole cargo handling apparatus.

Examples of the cargo handling apparatus according to an embodiment include a gantry crane and a bridge crane for example. In the following description, the embodiments will be explained using the context and terminology conventional to the gantry cranes and bridge cranes that operate fixed sized containers as cargo. However, it should be appreciated that the described embodiments may be applied to handling of other cargo than the containers. The containers, also known as freight containers, are a reusable transport and storage units for moving products and raw materials between locations or countries. The handling of the containers takes place typically in container terminals.

A typical container is a structure of metal e.g. steel, having a shape of a rectangular cuboid. Accordingly, the adjacent sides of the container connect at corners having right angles and opposite sides of the container are equal. The spreader connects to at least part of the corners. Typically the spreader connects the containers at the corners of the roof of the container.

Figure 2:
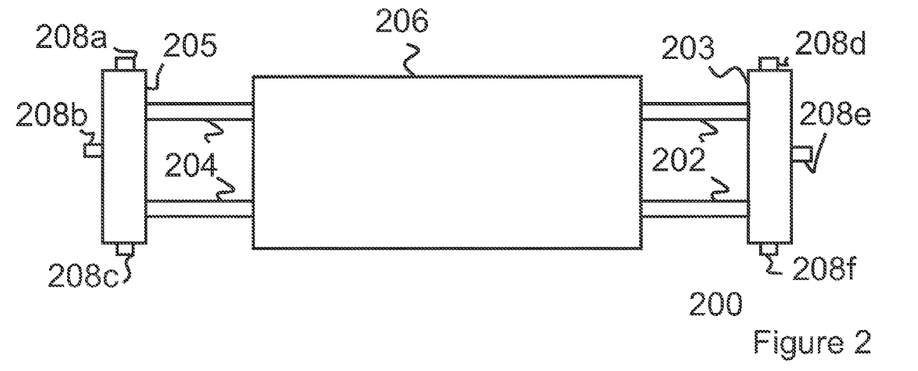
FIG. 2 illustrates a spreader including distance sensors installed according to an embodiment.

FIG. 2 illustrates a spreader 200 including distance sensors 208 a-f according to an embodiment. The spreader may be installed to a cargo handling apparatus of FIG. 1, for example. A typical spreader includes a main body 206, where one or more ropes from hoisting machinery are connected, and telescopic arms 204, 202 that extend between the main body and head beams 203, 205. The head beams include locking mechanisms that allow locking the spreader to the container that is handled. Examples of the locking mechanisms include mechanisms well-known from gantry cranes and bridge cranes, where the locking mechanisms attach to corners of containers.

The telescopic arms allow aligning the head beams according to the size of the container being handled. In the illustration, the telescopic arms allow elongating and shortening the distance between the head beams so that different lengths of containers may be handled. The main body may include machinery that operatively connect to the telescopic arms to provide power for extending or shortening the arms.

Preferably the distance sensors are installed to the head beams to allow measuring distances at corners of the container, when the container is attached to the spreader. The distance sensors 208a, 208d, 208c and 208f provide measurements along the length of the handled container and the distance sensors 208b and 208e provide measurements along the width of the handled container. When attached to the spreader, the container extends under the spreader between the head beams that form the attachment between the spreader and the container. When the distance sensors are attached to the head beams they are moved with the head beams, when the telescopic arms are elongated or shortened. In this way the position of the distance sensors may be adjusted to correspond to the size of the container that is attached to the spreader.

The distance sensors may be connected to the spreader by a resilient member that damps shocks and vibrations from the spreader, when container is handled. The resilient members provide damping of forces from the cargo handling apparatus, for example a spreader. In this way, fault of the distance sensors may be decreased or even avoided. The resilient member may allow movement of the distance sensor. The resilient member may comprise one or more springs, coil springs, bending springs and/or a member of compressible elastic material, e.g. rubber. The elastic material may contain hollow sections, or may comprise a membrane.

Figure 7:
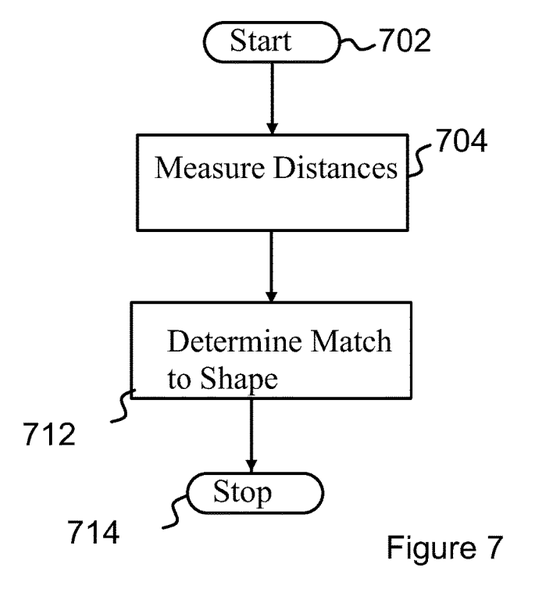
FIG. 7 illustrates a process of container handling by a spreader according to an embodiment.

In the following container 312, 414 handling by a spreader 306, 406 using distance sensors will be explained with reference to FIGS. 3a, 3b, 4a and 4b, where measurements from a distance sensor are used to determine one or more reference lines, and FIG. 7 illustrating a process of container handling by a spreader according to an embodiment.

In FIGS. 3a, 3b, 4a and 4b the spreader is viewed from the side of one of the head beams of the spreader. A distance sensor 308a, 308b, 408 is connected to the head beam. An example of the spreader and the distance sensor are described in FIG. 2. According to the example of the spreader illustrated FIG. 2, the distance sensor may be the distance sensor 208a or 208f.

Figures 3A, 3B:
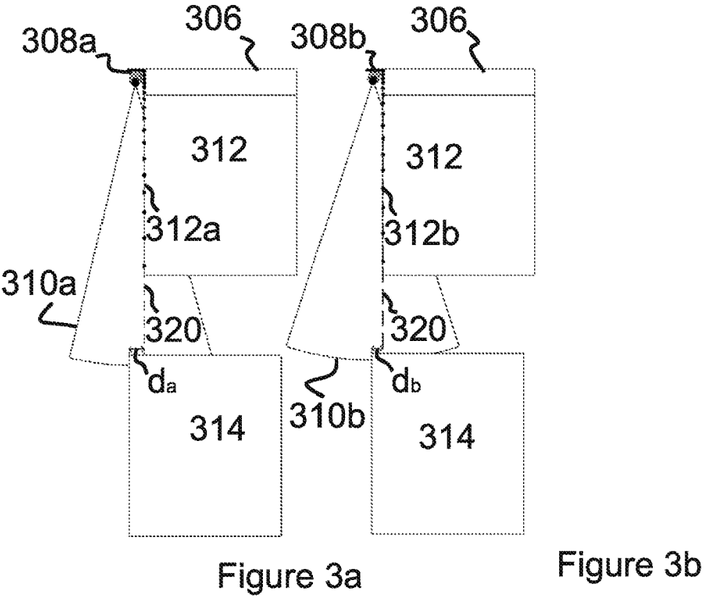
FIGS. 3a and 3b illustrate operation of container handling by a spreader according to an embodiment.
Figures 4A, 4B:
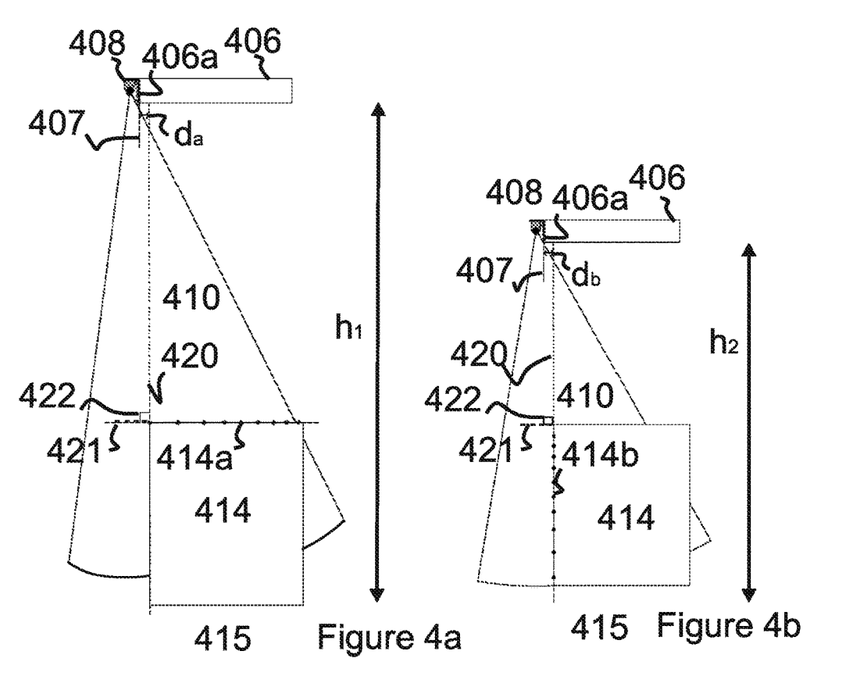
FIGS. 4a and 4b illustrate operation of container handling by a spreader at different heights according to an embodiment.

In FIGS. 3a and 3b the container handling is illustrated, when the container is picked up from atop another container 314 or stacked on top of the other container 314. FIGS. 4a and 4b illustrate operation of container handling by a spreader 406 at different heights $h_1$, $h_2$. Accordingly, the height $h_1$, $h_2$ of the spreader 406 can be used to control operation of the container handling. At the higher altitude $h_1$, a vertical side 414b of the container may be too far for reliably measuring distances by the distance sensor. Accordingly, the vertical side may be out of range of the distance sensor at the higher altitude. Then, the distances may be measured by the distance sensor from the horizontal side 414a of the container. When the spreader is at the lower altitude $h_2$, the measurements may be made from the vertical side or both from the vertical side and the horizontal side. The high and low altitude may be determined by the range of the distance sensor. In practice, the altitudes may also be affected by the position of the distance sensor with respect to the perimeter of the spreader. For example, the further the distance sensor is horizontally located from the perimeter of the spreader, the higher the altitudes are that may be used to start reliably measuring distances by the distance sensor from the vertical wall of the container. Another parameter to be considered in practical implementations when determining the altitudes, is the angular resolution of the distance sensor. In one example an altitude of one meter or two meters measured from a container to be picked up, may be used as the altitude for making distance measurements from the vertical wall of the container.

Information of the altitude of the spreader may obtained from information received from a drive system, laser scanners, radio frequency distance sensor and/or a camera, and the obtained information may be processed using algorithms depending on implementation to determine the altitude of the spreader.

The container handling may start 702, when the spreader is operational and can move to pick up a container and attach to a container. The spreader is installed with one or more distance sensors which are operational to measure distances to objects within one or more opening angles 310a, 310b, 410.

A reference line represents distance measurements to the same physical object, e.g. container, at different time instants, whereby cargo handling operations may be performed with respect to the physical object even if the distance sensor is moved, e.g. by shocks or vibrations communicated to the distance sensor from the spreader. In this way movement of the distance sensor between may be compensated for, whereby accurate handling of the containers is facilitated.

In various embodiments, reference lines provide calculation of direct distances to known objects, for example a container carried by the spreader. The distances may be calculated from other objects assuming that sufficiently information is available of the shapes of the objects. When the objects are containers, their shapes are rectangular with standardized dimensions. Thereby calculation of distances is facilitated without information of an exact position and/or direction of the distance sensor.

During the use of the spreader, the distance sensor continuously measures 704 distances to objects within its opening angle. Consequently, a movement of the distance sensor to a new position with respect to the operated container and/or to the spreader produces new measurements of the distance within the opening angle. The movement of the distance sensor is illustrated in the FIGS. 3a and 3b, where the distance sensors 308a, 308b have different positions resulting in opening angles 310a, 310b with different directions. When the distance sensor moves, objects falling within the opening angle in subsequent measurements may be different and/or objects within the opening angle in both measurements may be measured at different distances. The measurements may be performed at a rate of 20 Hz or 25 Hz for example. At each measurement distance values to objects within the opening angle are obtained.

A measurement performed over an opening angle may be matched 712 with one or more reference lines. The matching provides positioning the reference line with respect to the distance sensor by the measured distances at the time instant of the measurement. The distance sensor may record the time instant of the measurement and provide the measured distance value with the time instant to facilitate further processing of the measurements.

In FIGS. 3a, 3b, 4a and 4b, the distance sensor have opening angles 310a, 310b, 410 that are directed downwards. A downward direction comprises the directions towards the ground 415 on which the containers are resting. Accordingly, the downwards direction may be defined by the direction in which the spreader is hoisted in container handling. The downward direction may include directions directed downwards and below to the spreader, whereby distances may be measured from below the spreader. In this way optical signals from the distance sensor may be transmitted towards the ground, where containers are stacked and picked up.

In an embodiment, the opening angle of the distance sensor includes directions outwards, for example upwards or in a horizontal direction, from the spreader. The horizontal direction may comprise directions in the horizontal direction of movement of the spreader, for example when the spreader is moved between vertical support structures such as in FIG. 1. In this way the distance sensor may make measurements from objects around the spreader, e.g. from container stacks. An upward direction may comprise a direction opposite to the downward direction, when the spreader is moved upwards or downwards in a vertical movement direction. In this way the optical signals from the distance sensor may be transmitted in directions that are upward from the spreader such that distances may be measured when container is hoisted.

It should be appreciated that at each installation location of a laser scanner to a spreader, one or more of the above opening angles may be provided by a single laser scanner or by combining a plurality of laser scanners to provide the opening angles.

It should be appreciated that the opening angle is preferably directed such that is provides the distance sensor to perform measurements in the directions, where containers are being handled by the spreader. Since the spreader picks up and stacks containers, the opening angle is preferably directed towards the ground and below the spreader so that the container that is handled is located within the opening angle. Additionally, the opening angle or further opening angles may be arranged to obtain measurements from directions around the instant container that is handled. These directions enable detecting obstacles around the spreader which may be used to facilitate optimal movement paths for the spreader and improve security of container handling.

In one example the laser scanners of the spreader are directed downwards according to the illustration of FIGS. 3a, 3b, 4a and 4b, whereby the opening angles of the laser scanners include the vertical sides of the containers 312, 414. In this way, when laser scanners are arranged to the containers according to the FIG. 2, distances may be measured by the laser scanners 208a, 208d, 208c, 208f at the corners of the container by the laser scanners, and by the laser scanners 208b and 208e at the center of the sides of the container aligned with the head beam.

When the container is handled, for example as illustrated in FIGS. 3a, 3b, 4a and 4b, the distance sensor measures 704 distances by optical signals transmitted in the directions within the opening angle 310a, 310b, 410 of the distance sensor. The opening angle may be provided by blocking the transmissions of optical signals in other directions but the directions within the opening angle. The blocking may be provided by a casing having a window defining the opening angle. When a laser scanner is used, the selection may be performed by a rotating mirror as explained above.

The measured distances are matched 712 with a shape of at least one of the sides 312a, 312b, 414a, 414b of the container. The measured distances may be received from the distance sensor in a message, e.g. a data packet, including results of the distance measurements for the directions within the opening angle. A match between a side of the container and the measured distances may be determined, when the side, defined as a plane or as a line, aligns with the measured distances. It should be appreciated that the measured distances may not align perfectly with the definition of the side, but an error may be present. The error may be measured to determine whether it is within an acceptable range. In the FIGS. 3a, 3b, 4a and 4b the side 312a, 312b, 414a, 414b and the matching reference line 320, 420, 421 have been illustrated, when they are aligned.

In one example a side of the container may be defined by a line that is a straight line 320, 420, 421. The line may be an approximation of the side. Thereby the actual shape of the side may be more complex than the straight line. However, it is preferable that the side has more than one occurrence of areas that substantially correspond to the straight line to facilitate obtaining measurements from the container that match the straight line. The straight line may be defined by a linear relationship y=ax+b in a two-dimensional space defined by x and y axes, whereby a and b are coefficients defining the position of the line with respect to the axes.

When the measured distances are matched 712 with a side of the container, the matching 712 may comprise determining a line that defines a side of the container and that aligns with the measured distances. When the side of the container is defined by a straight line, the measured distances are processed to determine, whether they align with the straight line.

The aligning may be performed by determining variables a and b in the equation for the straight line for example using linear regression. If the processing results in values of the variables a and b, it may be determined that the line aligns with the side of the container and the side is detected. It should be appreciated that the measured distances may not exactly fit to the straight line, but an error may be permitted as is conventional in data obtained by measurements. When the line aligns with the side of the container, it may be used as a reference line, when the spreader is moved on the basis of the distance measurements of consecutive time instants.

When no variables a and b can be determined such that the measured distances would fit the straight line, it may be determined that a side of the container is not detected.

When the measurements are processed, the process may end 714. The reference line determined by the process may be used to control operation of the spreader or the cargo handling apparatus including the spreader. The controlling may comprise driving the spreader and/or a cargo handling apparatus, where the spreader is installed.

Next the operation of container handling is described at different heights of the spreader by reference to FIGS. 4a and 4b. In FIG. 4a, the spreader is at a high $h_1$ altitude and in FIG. 4b the spreader is at a low altitude $h_2$. The high altitude and the low altitude may be defined with respect to an object such as container 414 below the spreader, e.g. when the container 414 is picked up or when a container attached to the spreader is lowered in top of the container 414. In a similar manner the altitudes may be defined with respect to the ground 415 on which container is operated, e.g. when the container is picked up from the ground or lowered to the ground. At different heights of the spreader, the distance measurements may be matched, according to the process of FIG. 7, with different sides of the container.

In FIG. 4a a reference line 421 for matching with measurement of the distance sensor is determined to a side 414a of the container closest to the spreader. Typically the side is a horizontal side of the container. In FIG. 4b a reference line 420 for matching with measurements of the distance sensor is determined to a side 414b of the container that connects to the side 414a closest to the spreader. Typically the side is the vertical side of the container. Accordingly, when the reference line of the horizontal side of the container is used at a high altitude, distance measurements may be matched with the reference line even at high altitudes, where the vertical side of the container is not yet included in the opening angle of the distance sensor. Then at a lower altitude of the spreader the measurements of the distance sensor may be matched with a reference line of the vertical side of the container. In this way guiding information for driving the spreader and/or a cargo handling apparatus including the spreader may be obtained at different height of the spreader. Accordingly, the height may be used to determine the reference lines that the distance measurements are matched with.

An embodiment comprises matching a reference line of a horizontal side 421 of a container and a reference line of the vertical side 420 of the container, with measurements from a distance sensor. The matching may be performed according to the process of FIG. 7 for each reference line defining a side of the container. When reference lines of the sides have been determined by the matching, a point of intersection of the reference lines may be determined 422. This point represents the corner of the connected sides, e.g. a corner of a container. Information of the intersection point of the reference lines may be then used in controlling the operation of the spreader and/or cargo handling apparatus including the spreader as explained above.

An embodiment includes measuring distances 704 by a distance sensor installed to a spreader such that the spreader or a part of the spreader is included in at least one opening angle of the distance sensor. In this way the measurements of the distance sensor may be matched to reference lines even if no container is located within the opening angle. The distance sensor may have more than one opening angles, for example two or three. The opening angle may include a structure of the spreader arranged along a direction of movement of the spreader. The direction of movement may be a horizontal direction or a vertical direction. The structure may be for example a vertical part 406a of the head beam 406 or the head beam may be installed a separate vertical part. When the distance measurements are received from the structure, the measurements may be matched to a reference line of the structure. When the structure is an even surface in the vertical direction, the measurements may be aligned with the reference line and the reference line may be projected to span in the vertical direction.

In an embodiment, the structure of the spreader located within an opening angle of the distance sensor comprises a vertical projection connectable to the spreader. The vertical projection may be connected to the locking mechanism of the spreader for example. The vertical projection may be implemented by a steel panel that projects in the vertical direction from the spreader. One or more of the distance sensors installed to a spreader may be co-located with a corresponding vertical projection to allow a reference line to be determined.

It should be appreciated that, a reference line 407 determined to a spreader allows to determine further measurements, from other objects and/or reference lines, with respect to the spreader. Particularly, when a distance sensor is resiliently connected to the spreader, the distance sensor does not directly follow the movement of the spreader, whereby measured distances to the spreader change between measurement time instants as well as measurements in other opening angles change due to shocks and vibrations. Consequently, determining a reference line to the spreader allows compensating an error introduced to the distance measurements due to movement of the distance sensor with respect to the spreader.

According to the illustration of FIGS. 4a and 4b, a reference line may be determined that matches 712 with distance measurements from a vertical part of the head beam and one or more reference lines 420, 421 are determined that match 712 with the sides 414a, 414b of the container. When a reference line 420 matching to the measurements from the vertical side 414b of the container and a reference line 407 matching to the measurements from the vertical part 406a of the head beam 406 are determined, a distance $d_a$, $d_b$ between the curves may be determined. When a reference line 420 matching to the measurements from the vertical side 414b of the container and a reference line 421 matching to the measurements from the horizontal side 414a of the container are determined, their intersection defines a corner 422 of the container. In this way, a distance $d_b$ between the corner and the reference line that matches the vertical part of the head beam 406 may be determined. The determined distance may be used to control the operation of the spreader and the cargo handling apparatus including the spreader.

It should be appreciated that depending on implementation only one of the reference lines matching the horizontal and vertical sides of the cargo is determined. For example, a reference line matching the vertical side of the cargo may be determined and expressed by a linear relationship $y_1 = a_1 x + b_1$, and a reference line determined from the vertical side of the head beam may be expressed by a linear relationship $y_2 = a_2 x + b_2$, whereby the distance between $y_1$ and $y_2$ may be calculated as and used in driving the spreader. Preferably the reference lines are parallel such that their respective distance is the same along the reference lines. In practice, the parallel lines are provided in implementations, where both of the reference lines are determined by vertical structures. However, if the reference lines are not parallel, their respective distance may be determined by an average value, a minimum value, or as a maximum value along the reference lines. Moreover, a specific reference point may be defined on each reference line, whereby the distance may be calculated between the reference points of the reference lines.

Accordingly, in various embodiments one or more reference lines may be matched with distance measurements and the reference lines may be different depending on the height of the spreader. The distance measurements may be obtained from one or more opening angles, whereby the matching is performed separately for each opening angle.

Figure 5:
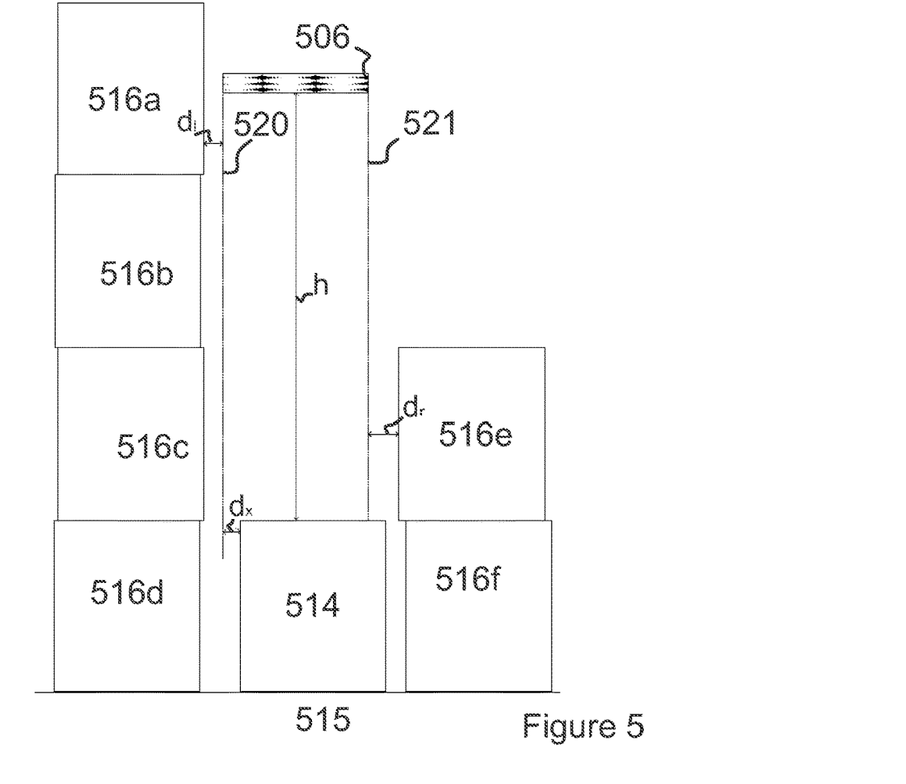
FIG. 5 illustrates picking up a container between adjacent stacks of containers by a spreader according to an embodiment.

FIG. 5 illustrates picking up a container 514 between adjacent stacks of containers by a spreader 506 according to an embodiment. The spreader may include one or more distance sensors installed to the spreader as explained in FIG. 2. The measurements of the distance sensor may be processed as described above with reference to FIGS. 3a, 3b, 4a, 4b and 7. The operation illustrated in FIG. 5 is particularly useful in scenarios, where stacking of containers includes inaccuracies in the placement of the containers on top of each other. These inaccuracies may be due to prevailing weather conditions, e.g. a strong wind, or human errors.

In FIG. 5 containers 516a, 516b, 516c, 516d form one stack and containers 516e, 516f form another stack. A container 514 on the ground 515 between the stacks is to be picked up by the spreader. Since the container stacks include errors in the placement of the containers, the distance between the stacks varies. At the bottom of the stacks distance between the two stacks is greater than the distance above containers 516d, 516f at the bottom.

When the spreader is lowered to pick up the container 514, distance measurements may be performed by the distance sensors and they may be processed according to the process of FIG. 7 to improve accuracy of the distance measurements. Since the spreader is moved between the two stacks distance sensors are installed on both sides of the spreader, for example on both sides of the head beam, in a similar manner as described in FIGS. 3a, 3b, 4a, and 4b for one distance sensor.

Since the spreader is not carrying a container, the distance measurements may be successfully matched with the containers in the stacks and, when within the range of the distance sensor, to the vertical walls of the container that is to be picked up. The opening angles of the distance sensors arranged such that distances may be measured from the sides of the containers in the stacks and also from the container that is picked up. The reference lines 520, 521 may be determined by including parts of the spreader within the opening angle of the distance sensors similar to described with FIGS. 4a and 4b. A distance between the reference line 520 and the reference line matching to the container at the left side of the spreader is illustrated by $d_l$, and a distance between the reference line 521 and the reference line matching to the container at the right side of the spreader is illustrated by $d_r$. Preferably the reference line determined by the adjacent cargo is determined to the cargo nearest to the spreader in a horizontal direction to determine the shortest distance between the spreader and the adjacent cargo.

A distance, $d_x$, may be defined as a distance between reference line 520 and the reference line matching to distance measurements from a vertical side of the container 514 that is picked up.

A process for driving a spreader to pick up a container in the scenario of FIG. 5 may be defined as:

defining a target position $d_x$ of the container, where the $d_x$ may be 0 or some other value indicating a position of the spreader to the container, and it may include a compensation for the ground inclination;

defining safety distances, $d_r$, $d_l$, between the spreader and adjacent containers, where $d_r = d_l$, if $d_r$ or $d_l$ is not available;

defining weights for the target position and the safety distances for different heights of the spreader;

determining a height h of the spreader; and driving the spreader to meet the safety distance and the target position under control of the weights corresponding to the determine height of the spreader.

In one example of the weights $w_1$ for the target position and weight $w_2$ for the safety distance may be defined as a function of the height h of the spreader as follows:

when $h < h_1$, then $w_1 = 1$ and $w_2 = 0$
when $h > h_2$, then $w_1 = 0$ and $w_2 = 1$
otherwise $w_1 + w_2 = 1$, and $0 <= w_1 <= 1$, and $0 <= w_2 <= 1$ In the above definition of the weight the two heights are such that $h_1 < h_2$.

It should be appreciated that also further heights and corresponding weights $w_1$ and $w_2$ for the heights may be defined. It is possible also to define only one height limit that may be used to determine which of two sets of weights should be applied in driving the spreader.

The weights may be used in driving the spreader in various ways. In one example the spreader may be driven by minimizing weighted deviations from the target position and the safety distance, where the weighted deviations maybe expressed as:

$w_1 e_2 + w_2 e_2$, where $e_1$ and $e_2$ are the deviations of the target position and the safety distance respectively.

Figure 6A:
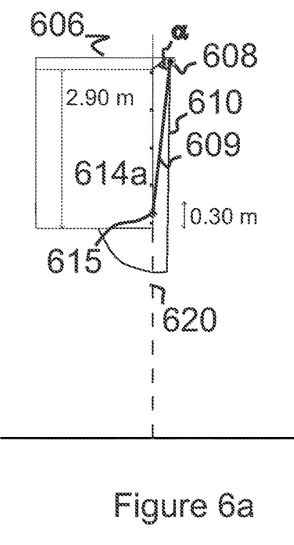
FIGS. 6a and 6b illustrate size detection of containers by distance measurements according to an embodiment.
Figure 6B:
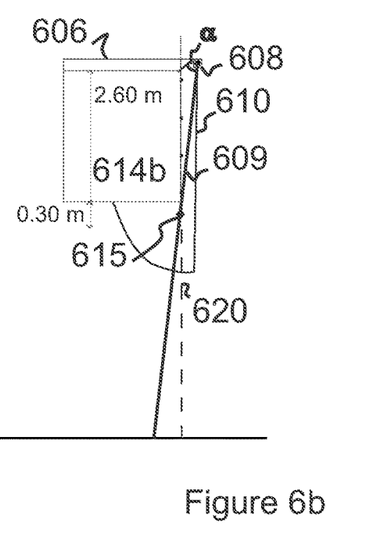

FIGS. 6a and 6b illustrate container size detection according to an embodiment. FIGS. 6a and 6b have different sizes of containers 614a, 614b that are handled by a spreader 606 equipped with a distance sensor 608. The distance sensor and the spreader may be arranged operational to measure distances from the container that is handled by the spreader. The measured distances may be processed as described above to determine a reference line 620 matching a vertical side of the container. The container 614b of height 2.6 m, has 0.3 meters smaller height than the container 614a of height 2.9 m. This height difference illustrates a typical situation observed between a high cube container having the height of 9 feet and 6 inches, approximately 2.9 m, and a normal height container having the height of 8 feet and 6 inches, approximately 2.6 m.

When the distance sensor performs the measurements, optical signals 609 are transmitted towards the container attached to the spreader. Distances are measured on the basis of those transmitted optical signals that reflected back from the vertical side 614a, 614b of the container. Accordingly, an optical signal transmitted at least at angle $\alpha$ intersects a reference line matching the vertical side of the container at an intersection point 615. The intersection point is located on the reference line below the container, when the container is a normal height container, and on the reference along the vertical side of the container, when the container is a high cube container.

The operation of the container size detection may follow the process described in FIG. 7 to determine a reference line matching the vertical side of the container. When the reference line has been determined from the distance measurements received from the distance sensor, lengths of containers may be determined along the reference line. Different heights of containers extend to different lengths of the reference line in the downward direction. Accordingly, different container types may be determined on the basis of their length along the reference line.

The length of the container along the reference line may be determined on the basis of optical signals transmitted from the distance sensor for measuring distances based on the reflections of the transmitted optical signals. When the transmitted optical signals are reflected back from a length of the reference line that matches to a height of a specific type of container, e.g. a high cube container, it may be determined that the container attached to the spreader is of the specific type. When the transmitted optical signals are not reflected back from a length of the reference line that matches to a height of a specific type of container, e.g. the high cube container, it may be determined that the container attached to the spreader is shorter than the specific container, e.g. a normal height container. When an optical signal transmitted at a given angle $\alpha$ is not reflected back, distance measurements are not received from such transmission angle. This means that there are no objects within the opening angle 610 at the given transmission angle and operating range of the distance sensor.

Accordingly, when the container is small, e.g. a normal height container, the optical signal transmitted below the container at least at angle $\alpha$ do not reflect back from the vertical side of the container, whereby the distance measurements using the angle $\alpha$, or a greater angles of the opening angle, will exceed distances to the reference line. This means that the distance measurements are beyond the reference line. The measurement results at the angle $\alpha$ or greater angles may be in practice denoted by 'N/A', when no measurements have been made within the range of the distance sensor, or a default distance measurement value, for example a range of the distance sensor, may be used to denote that measurements were not made.

In an embodiment a transmission angle $\alpha$ or a range of adjacent transmission angles including the opening angles greater than or equal to $\alpha$ may be defined that may be used to determine a height of the container. For example, using the example of a high cube container and a normal height container in FIGS. 6a and 6b, the distance sensor may have an opening angle, where measurements are made to objects within the opening angle and within a measurement range of the distance sensor. A subset of the transmission angles is used to determine a height of the containers attached to the spreader. In the illustration the subset includes the opening greater than or equal to $\alpha$. The subset of the angles comprises opening angles directed below the container and to the length of the reference line exceeding a height of at least one container along the reference line, when the container is attached to the spreader. When distance measurements are received from the subset of the transmission angles, it may be determined that the attached container is higher than the container whose height along the reference line was exceeded. The height of a container along the reference line may be determined in practice by calibrating the transmission angles for the height measurements using different types of containers.

The height determination explained above provides optimization of handling of container having different heights. When the handled container is determined as having a smaller height than a high container, e.g. the high cube container, the container may be driven closer to a stack with a higher speed, before deceleration, than if a higher container was assumed. This enables saving time in container handling, whereby handling of more container in a given time period is facilitated.

Figure 8A:
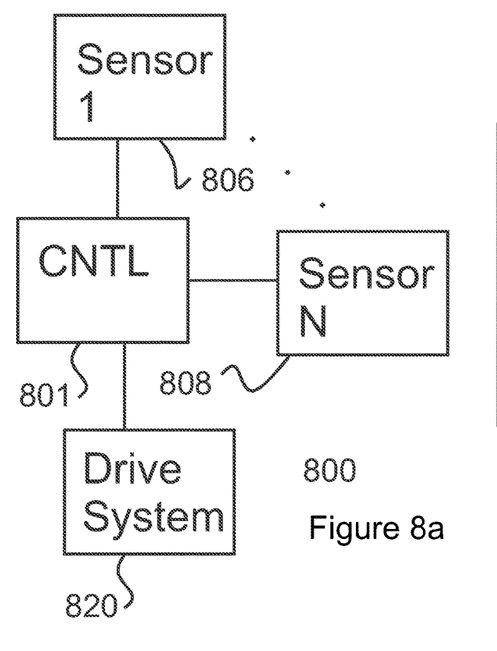
FIG. 8a shows an arrangement for measuring distances in a container handling apparatus.

FIG. 8a shows architecture of an arrangement 800 for measuring distances in a cargo handling apparatus. The arrangement may be implemented as an automation system of the cargo handling apparatus. The arrangement includes one or more distance sensors 806, 808 and a control unit 801 and a drive system 820, which are electrically interconnected. The connections between the control unit, sensor and the drive system may be implemented by electrical wiring and conforming to a communications standard, for example Ethernet, ISA (Industry Standard Architecture), ProfiBus (Process Field Bus) and CANOpen.

The control unit receives distance measurements from the sensors and processes them to be used in controlling the drive system. The control unit may send commands to the drive system to move the cargo handling apparatus and perform cargo handling operations.

The drive system may comprise an electrical motor driving a hoist of a spreader or a wheel of a crane, for example. Accordingly, the drive system moves the cargo handling apparatus and/or parts of the cargo handling apparatus, whereby cargo handling is facilitated. The distance sensor performs measurements of distances to objects within its opening angle. Results of the measurements are communicated to the controller that may use them to generate commands to control the drive system.

Altitude information of the spreader may be obtained from an altitude sensor connected to the controller. An example of a suitable sensor is a camera. The controller may process the received video from the camera e.g. by using object recognition algorithms to determine the altitude of the spreader. In another example the altitude information may be obtained from the drive system. The altitude information from the drive system may comprise an altitude value measured by the drive system e.g. based on hoisting information of rope length. The altitude information received from the drive system may be combined with information received form an altitude sensor, e.g. radio frequency distance sensor and/or a camera, connected to the controller, to obtain more accurate altitude information. In a typical example, altitude information may be obtained from an encoder or other device that connects to the drive system and transforms control commands from the control unit to operations of the drive system. The operations of the drive system may comprise a hoisting operation at a defined speed provided by the electric motor operating as controlled by the control commands from the encoder.

Figure 8B:
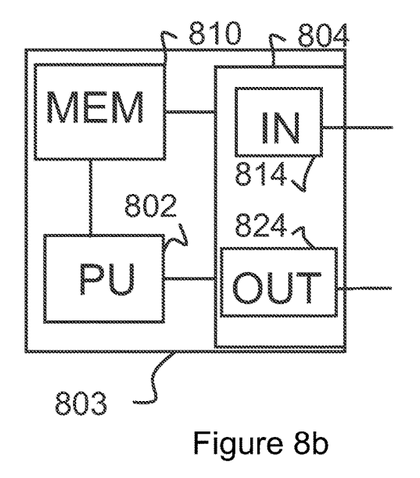
FIG. 8b shows a block diagram of an apparatus for processing distance measurements according to an embodiment.

FIG. 8b shows a block diagram of an apparatus 803 for processing distance measurements according to an embodiment. The apparatus may be the control unit 801 in the architecture of FIG. 8a. The apparatus comprises a processing unit 802, a memory 810 and an interfacing unit 804, all of which are electrically interconnected. The connections may be implemented by electrical wiring for example conforming to the above mentioned communications standards. Depending on the integration level of the apparatus, the connections may be implemented as internal buses, e.g. a connection between the processing unit and the memory, and/or as external buses, e.g. the connections from the interfacing unit to the memory and the processing unit. The interfacing unit provides communications of the apparatus with external devices. The communications may be electrical connections conforming to the above-mentioned standards.

The interfacing unit comprises an input unit 814 for reception of data and/or messages to the apparatus, and an output unit 824 for transmitting data and/or messages from the apparatus. The received information may comprise measurements from a distance sensor and the transmitted information may comprise commands for controlling a drive system of cargo handling apparatus, e.g. for hoisting a spreader.

An embodiment provides a computer program embodied on a distribution medium, comprising program instructions which, when loaded into an electronic apparatus, constitute an apparatus for according to an embodiment, e.g. the control unit 801 described earlier.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a programmable logic controller, a single electronic digital computer or it may be distributed amongst a number of computers.

The control unit 801 may also be implemented as one or more integrated circuits, such as application-specific integrated circuits ASIC. Other hardware embodiments are also feasible, such as a circuit built of separate logic components or a programmable logic circuit. A hybrid of these different implementations is also feasible. When selecting the method of implementation, a person skilled in the art will consider the requirements set for the size and power consumption of the control unit 801, necessary processing capacity, production costs, and production volumes, for example.

The steps/points, signaling messages and related functions described above in FIG. 7 are in no absolute chronological order, and some of the steps may be performed simultaneously or in an order differing from the given one. Other functions can also be executed between the steps or within the steps. Some of the steps or part of the steps can also be left out or replaced by a corresponding step or part of the step. The control unit 801 operations illustrate a procedure that may be implemented in one or more physical or logical entities.

Apparatuses for moving cargo, such as gantry cranes, bridge cranes, or other corresponding devices or apparatuses implementing the functionality of a corresponding apparatus described with an embodiment comprise not only prior art means, but also means for handling cargo that includes a plurality of interconnected sides, selecting directions for transmitting optical signals, measuring distances by reflected optical signals transmitted in the selected directions, determining on the basis of the measured distances a reference line that matches a shape of at least one of the interconnected sides of the cargo.

More precisely, they comprise means for implementing functionality of a corresponding apparatus described with an embodiment and they may comprise separate means for each separate function, or means may be configured to perform two or more functions. Present apparatuses comprise processors and memory that can be utilized in an embodiment. For example, the control unit 801 may be a software application, or a module, or a unit configured as arithmetic operation, or as a program (including an added or updated software routine), executed by an operation processor. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a control unit, may be configured as a computer or a microprocessor, such as single-chip computer element, including at least a memory for providing storage area used for arithmetic operation and an operation processor for executing the arithmetic operation. An example of the operation processor includes a central processing unit. The memory may be removable memory detachably connected to the apparatus.

It is as well useful to upgrade an existing apparatus for cargo handling by a spreader such as a spreader a gantry crane or a bridge crane by using a prepared kit. A kit can be prepared according different standards (electrical, mechanical) for different markets, models and sizes, and its installation is shorter with a good preparation and planning, which in turn gives a short down-time in production. Also maintenance is more fluent after upgrading, when known combination of parts are used, rather than using a selection of random choice for each upgrade.

Accordingly, in an embodiment it is provided a kit for an apparatus for cargo handling by a spreader. The kit may comprise a distance sensor capable of transmitting optical signals in selected directions, and a controller connected to the distance sensor to measure distances in the selected directions, wherein the controller and the distance sensor may be configured to determine on the basis of the measured distances a reference line that matches a shape of at least one of the interconnected sides of the cargo. The controller may comprise a control unit implemented according to the block diagram of FIG. 8b. Accordingly, the controller may be implemented as a computer program that is installed to a memory of the cargo handling apparatus, for example to an automation system of the cargo handling apparatus. After upgrading the existing apparatus with the kit, the upgraded apparatus may be driven with improved accuracy provided by the operation according to the various embodiments explained above. FIG. 8a illustrates an example of upgraded apparatus.

Accordingly, the kit may comprise the necessary one or more sensors such as laser scanners, a controller for determining the reference line. Resilient members may be included to the kit for connecting the kit or a part of the kit e.g. a laser scanner, to the cargo handling apparatus. The kit may further comprise cabling and power feeding equipment. The kit may be provided as a spreader that is equipped with the necessary one or more sensors and the controller. Installing such a spreader to an existing crane may not require more than to open and close mechanical couplings by which the head block supports the spreader, connecting electrical power cabling between the head block of the crane and the spreader and connecting the distance sensors communicatively to the spreader by way of either a wireless or a galvanic connection to facilitate communications of information, e.g. distance measurements, for driving the spreader and/or the crane, to the crane.

A control system of the existing crane may be upgraded to support the operations described in various embodiments by installing the control system equipment and/or a software program to receive and process the information received from the spreader, said information including e.g. distance measurements and positioning information. In this way the crane and/or the spreader may be driven with sufficient accuracy as described in the above embodiments.

Distance measurements and positioning information may be processed in a system, e.g. a control system, within the spreader (distributed intelligence), whereby it may be sufficient to communicate only control commands, e.g. in control steps defined by values of a one or more of axes of a three dimensional (XYZ) coordinate system, from the spreader to the crane, and/or to output from the spreader possible corrections regarding an angular position (list, trim, skew) of the spreader. Accordingly, the information obtained from the spreader may be used to control the movement of the spreader.

Customers upgrading their existing cranes with the described kit are provided with a higher capacity of cargo handling, e.g. handling of containers, with a relatively small investment, at least when considering the fixed costs.

Supplying a readily instrumented spreader provides the customer a particular advantage since the time to replacement of the old spreader with the new readily instrumented spreader does not have to include the time needed for instrumenting the spreader during down-time on-site. In this way the procedures that are part of the instrumenting, such as drilling and tapping holes for attaching equipment to the spreader, are not included in the replacement, whereby the downtime of the crane caused by the replacement is not increased by the time of instrumenting the spreader. Thereby, the readily instrumented spreader allows using the time of instrumenting the spreader for productive activity of the crane, which gives substantial financial benefits to the customer.

It will be obvious to a person skilled in the art that, as the technology advances, the inventive concept can be implemented in various ways. The invention and its embodiments are not limited to the examples described above but may vary within the scope of the claims.

The invention claimed is:

1. A method of cargo handling by a spreader including a distance sensor transmitting optical signals, the method comprising the steps of:
    handling cargo that includes a plurality of interconnected sides;
    selecting directions for transmitting optical signals;
    measuring distances by reflected optical signals transmitted in the selected directions; and
    determining on the basis of the measured distances a reference line that matches a shape of at least one of the interconnected sides of the cargo and using the reference line to calculate direct distances to the same physical object represented by the reference line at different time instants;
    matching a measurement performed over an opening angle with the reference line to position the reference line with respect to the distance sensor by the measured distances at the time instant of the measurement; and
    performing cargo handling operations with respect to the physical object when the distance sensor is moved, using the determined position to compensate a movement of the distance sensor.

2. The method according to claim 1, further comprising the step of determining a reference line on the basis of distance measurements from a vertical structure of the spreader, said vertical structure being located at least partly within the directions of transmission of the optical signals.

3. The method according to claim 1, further comprising the steps of:
    selecting transmission directions of the optical signals downwards and below the spreader; and, when cargo is attached to the spreader,
    determining a reference line on the basis of distance measurements from the cargo attached to the spreader.

4. The method according to claim 1, wherein a plurality of reference lines is determined that each match different sides of the cargo.

5. The method according to claim 1, wherein a plurality of reference lines are determined, wherein at least one of the reference lines matches a side of the cargo adjacent to the spreader, and at least one the reference lines match at least one of a vertical structure of the spreader and a side of the cargo being below the spreader.

6. The method according to claim 1, wherein a plurality of reference lines are determined, the method further comprising the steps of:
    defining a target position between the reference lines; and
    driving the spreader on the basis of the reference lines towards the target position.

7. The method according to claim 1, further comprising the steps of:
    defining an opening angle of the distance sensor, said opening angle including transmission directions of the optical signals; and
    determining a portion of the opening angle, wherein the transmission directions belonging to the determined portion correspond to a specific size of the cargo along a reference line.

8. The method according to claim 1, wherein the spreader is driven on the basis of distances measured from a horizontal side of the cargo, when the spreader is at a high altitude with respect to the ground or the cargo, and the spreader is driven on the basis of distances measured from a vertical side of the cargo, when the spreader is at a low altitude with respect to the ground or the cargo.

9. The method according to claim 1, wherein the measured distances comprise distances from a vertical structure of the spreader and distances from cargo adjacent to the spreader, and reference lines corresponding to the vertical structure and the adjacent cargo are determined on the basis of the measured distances, the method further comprising the steps of:
    determining a distance from a reference line corresponding to the vertical structure to the nearest reference line corresponding to the cargo; and
    driving the spreader on the basis of the distance.

10. The method according to claim 1, wherein the spreader comprises a locking mechanism for attaching to the cargo and at least one vertically projecting structure connected to the locking mechanism, wherein the vertically projecting structure is within the transmission direction of optical signals of the distance sensor.

11. The method according to claim 1, wherein the distance sensor comprises a laser scanner including a rotatable mirror for selecting directions of the laser scanner.

12. A cargo handling apparatus comprising:
a spreader for attaching to a cargo including a plurality of interconnected sides, the spreader including a distance sensor capable of transmitting optical signals in selected directions, and a controller connected to the distance sensor to measure distances in the selected directions; and
a control system including a processor programmed to determine on the basis of the measured distances a reference line that matches a shape of at least one of the interconnected sides of the cargo and use the reference line to calculate direct distances to the same physical object represented by the reference line at different time instants matching a measurement performed over an opening angle with the reference line to position the reference line with respect to the distance sensor by the measured distances at the time instant of the measurement, and perform cargo handling operations with respect to the physical object when the distance sensor is moved, using the determined position to compensate a movement of the distance sensor.

13. The cargo handling apparatus according to claim 12, wherein the spreader comprises a locking mechanism for attaching to the cargo and at least one vertically projecting structure connected to the locking mechanism, wherein the vertically projecting structure is within the transmission direction of optical signals of the distance sensor.

14. The cargo handling apparatus according to claim 12, wherein the distance sensor comprises a laser scanner including a rotatable mirror for selecting directions of the laser scanner.

15. The cargo handling apparatus according to claim 12, wherein the apparatus comprises a crane.

16. The cargo handling apparatus according to claim 12, wherein the distance sensor is connected to the spreader by a resilient member for damping shocks or vibrations from the spreader.

17. A computer program embodied on a non-transitory computer readable storage medium, the computer program being configured to control a processor to perform a method in cargo handling by a spreader including a distance sensor capable of transmitting optical signals, the method comprising the steps of:

handling cargo that includes a plurality of interconnected sides;

selecting directions for transmitting optical signals;

measuring distances by reflected optical signals transmitted in the selected directions; and determining on the basis of the measured distances a reference line that matches a shape of at least one of the interconnected sides of the cargo and using the reference line to calculate direct distances to the same physical object represented by the reference line at different time instants matching a measurement performed over an opening angle with the reference line to position the reference line with respect to the distance sensor by the measured distances at the time instant of the measurement, and performing cargo handling operations with respect to the physical object when the distance sensor is moved, using the determined position to compensate a movement of the distance sensor.

18. A kit for upgrading an apparatus for cargo handling by a spreader, the kit comprising:

a distance sensor capable of transmitting optical signals in selected directions; and a controller connected to the distance sensor to measure distances in the selected directions, wherein the controller and the distance sensor are configured to determine on the basis of the measured distances a reference line that matches a shape of at least one of the interconnected sides of the cargo and using the reference line to calculate direct distances to the same physical object represented by the reference line at different time instants matching a measurement performed over an opening angle with the reference line to position the reference line with respect to the distance sensor by the measured distances at the time instant of the measurement, and performing cargo handling operations with respect to the physical object when the distance sensor is moved, using the determined position to compensate a movement of the distance sensor.

19. The kit according to claim 18, further comprising:

a spreader installed with one or more said distance sensors and said controller; and an interfacing unit for communicating information from the controller to a control system of a cargo handling apparatus.

20. A method of upgrading an apparatus for moving cargo comprising the step of installing the kit according to claim 18 to a cargo handling apparatus.

* * * * *